United States Patent
Liu et al.

(10) Patent No.: US 12,556,928 B2
(45) Date of Patent: Feb. 17, 2026

(54) PAIRING METHOD APPLIED TO SHORT-RANGE COMMUNICATION SYSTEM AND WIRELESS DEVICE

(71) Applicant: HUAWEI TECHNOLOGIES CO., LTD., Guangdong (CN)

(72) Inventors: Huazhang Liu, Shenzhen (CN); Weihua Li, Shanghai (CN); Zhan Guo, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 684 days.

(21) Appl. No.: 17/971,820

(22) Filed: Oct. 24, 2022

(65) Prior Publication Data

US 2023/0052917 A1 Feb. 16, 2023

Related U.S. Application Data

(63) Continuation of application No. PCT/CN2020/086859, filed on Apr. 24, 2020.

(51) Int. Cl.
| | | |
|---|---|---|
| *H04W 4/00* | (2018.01) | |
| *H04W 12/03* | (2021.01) | |
| *H04W 12/069* | (2021.01) | |
| *H04W 12/50* | (2021.01) | |
| *H04W 76/14* | (2018.01) | |

(52) U.S. Cl.
CPC ........... *H04W 12/50* (2021.01); *H04W 12/03* (2021.01); *H04W 12/069* (2021.01); *H04W 76/14* (2018.02)

(58) Field of Classification Search
CPC ... H04W 12/50; H04W 76/14; H04W 12/069; H04W 12/03
USPC ....................................................... 370/329
See application file for complete search history.

(56) References Cited

U.S. PATENT DOCUMENTS

| | | | |
|---|---|---|---|
| 10,771,458 B1 * | 9/2020 | Xia | ........................ H04W 12/64 |
| 10,799,157 B2 * | 10/2020 | Wedekind | ........... A61B 5/14865 |
| 11,102,655 B1 * | 8/2021 | Young | .................... H04W 12/50 |

(Continued)

FOREIGN PATENT DOCUMENTS

| | | |
|---|---|---|
| CN | 102170636 A | 8/2011 |
| CN | 108270572 A | 7/2018 |
| CN | 110061830 A | 7/2019 |

OTHER PUBLICATIONS

Rathore M Mazhar et al: "Smart Home Security: A DistributedIdentity-Based Security Protocol for Authentication and Key Exchange",2019 28th International Conference on ComputerCommunication and Networks (ICCCN), IEEE, Jul. 29, 2019(Jul. 29, 2019), pp. 1-9, XP033620552, D01:10.1109/ICCCN.2019.8847034 [retrieved on Sep. 23, 2019].

(Continued)

*Primary Examiner* — Marceau Milord

(57) ABSTRACT

A pairing method applied to a short-range communication system and a related wireless device in the field of wireless communication are disclosed. The method includes: obtaining, by a first wireless device, a first password, where the first password is shared by the first wireless device and a second wireless device; and pairing, by the first wireless device, with the second wireless device based on a password-based authenticated key exchange (PAKE) protocol and by using the first password as an encryption password in a key exchange process.

20 Claims, 8 Drawing Sheets

(56) References Cited

U.S. PATENT DOCUMENTS

| | | | | |
|---|---|---|---|---|
| 2015/0359022 | A1* | 12/2015 | Lau | H04W 76/14 |
| | | | | 455/41.2 |
| 2016/0087967 | A1* | 3/2016 | Pang | H04W 76/11 |
| | | | | 726/6 |
| 2016/0112825 | A1* | 4/2016 | Miller | H04W 4/80 |
| | | | | 455/41.2 |
| 2016/0269979 | A1* | 9/2016 | Ide | H04W 4/80 |
| 2016/0309323 | A1* | 10/2016 | Zarakas | G06Q 20/3829 |
| 2016/0366713 | A1* | 12/2016 | Sonnino | G09G 5/12 |
| 2017/0004475 | A1* | 1/2017 | White | G06Q 20/322 |
| 2017/0006411 | A1* | 1/2017 | Zakaria | H04W 4/80 |
| 2018/0317266 | A1* | 11/2018 | Britt | H04W 4/80 |
| 2019/0098006 | A1* | 3/2019 | Kim | H04L 9/3273 |
| 2019/0118767 | A1* | 4/2019 | Britt | H04L 67/125 |
| 2020/0008722 | A1* | 1/2020 | Wedekind | A61B 5/0004 |
| 2020/0314247 | A1* | 10/2020 | Klingler | H04M 3/54 |
| 2020/0336895 | A1* | 10/2020 | Bartlett | H04L 9/3247 |
| 2021/0044965 | A1* | 2/2021 | Nambisan | H04W 12/63 |
| 2021/0084700 | A1* | 3/2021 | Daniels | H04L 9/3226 |
| 2021/0125143 | A1* | 4/2021 | Bartlett | G06Q 10/0832 |
| 2021/0261073 | A1* | 8/2021 | Lee | H04L 41/0806 |

OTHER PUBLICATIONS

International Search Report and Written Opinion issued in PCT/CN2020/086859, dated Jan. 12, 2021, 10 pages.
Extended European Search Report issued in EP20931748.6, dated May 3, 2023, 9 pages.
Office Action issued in CN202080098907.X, dated Dec. 5, 2024, 6 pages.

* cited by examiner

PAIRING METHOD APPLIED TO SHORT-RANGE COMMUNICATION SYSTEM AND WIRELESS DEVICE

CROSS-REFERENCE TO RELATED APPLICATIONS

This application continuation of International Application No. PCT/CN2020/086859, filed on Apr. 24, 2020, which is hereby incorporated by reference in its entirety.

TECHNICAL FIELD

This application relates to the field of wireless communication, and in particular, to a pairing method applied to a short-range communication system and a wireless device.

BACKGROUND

With arrival of an internet of things era, it is an increasingly important problem to implement secure and fast wireless connection between devices. Currently, wireless interconnection physical layer technologies in an internet of things include wireless fidelity (Wi-Fi), ZigBee, near field communication (NFC), a cellular-based narrowband internet of things (NB-IoT), and the like. A Bluetooth technology is used as an example. In this case, from a perspective of a user, unassailable security is required, and convenience is desired by the user for use.

Currently, a commonly used pairing method between wireless devices, for example, Bluetooth pairing, requires a user input and operation, and is relatively complex to use, resulting in poor user experience. Currently, a mainstream Bluetooth pairing solution is to use a Bluetooth simple pairing protocol. When Bluetooth pairing is performed by using the Bluetooth simple pairing protocol, two pairing parties need to confirm that 6-digit random numbers on a screen are the same, and there is a relatively large quantity of information exchange times. For a user that has an increasingly high requirement, a current popular pairing method usually requires a user input or operation, and it takes a relatively long time to perform pairing. Therefore, a new wireless device pairing method needs to be studied.

SUMMARY

Embodiments of this application provide a pairing method applied to a short-range communication system and a wireless device, to shorten a time spent by the wireless device in performing pairing, and improve user experience.

According to a first aspect, an embodiment of this application provides a pairing method applied to a short-range communication system. The method includes: A first wireless device obtains a first password, where the first password is shared by the first wireless device and a second wireless device; and the first wireless device pairs with the second wireless device based on a password-based authenticated key exchange (PAKE) protocol and by using the first password as an encryption password in a key exchange process.

Both the first wireless device and the second wireless device are devices that can implement short-range wireless communication. Both the first wireless device and the second wireless device may store the first password, or may obtain the first password based on same private information. It should be understood that a user usually stores private information, for example, an account, a password, biometric feature information, a digital signature, and a digital certificate, only in one or more devices trusted by the user. In addition, only the device trusted by the user is allowed by the user to obtain the private information of the user. In other words, only the device (namely, a trusted device) trusted by the user can obtain and/or store the first password. The first wireless device and the second wireless device may be considered as trusted devices of a same user. A plurality of trusted devices of a same user are trusted, and therefore the method procedure provided in this embodiment may be performed to implement pairing more quickly, in other words, implement quick pairing. The method provided in this embodiment is applicable to two or more devices that store or can obtain a same first password. For example, the first wireless device is a mobile phone, and the second wireless device is a tablet computer. Both the two wireless devices store the first password obtained by encrypting the same private information by using a secure one-way encryption algorithm such as a message-digest algorithm (MD) or a secure hash algorithm (SHA). The first wireless device and the second wireless device store or can obtain the same first password, and therefore the first wireless device and the second wireless device may quickly implement a pairing procedure by using the first password. In this way, no user input or operation is required, and therefore the time spent in implementing pairing can be reduced, to improve user experience. In the password-based authenticated key exchange (PAKE) protocol, a session key with relatively high security is negotiated by using a pre-shared password. In addition, the PAKE protocol is applied to a short-range communication system in which pairing is performed between two or more wireless devices, and the two or more wireless devices may quickly negotiate a session key with relatively high security by using a shared password. Therefore, there is a relatively small quantity of information exchange times.

In this embodiment, the first wireless device and the second wireless device share the first password, and therefore the first wireless device may pair with the second wireless device based on the PAKE protocol and by using the first password as an encryption password in the key exchange process. In this way, no user input or operation is required, and therefore a time spent in implementing pairing can be reduced, to improve user experience.

In a possible implementation, the first password includes at least one of an account, a password, a digital signature, biometric feature information, a digital certificate, or voice information.

In this implementation, the user may use different information as the first password, in other words, a specific form of the first password is not limited, to meet different requirements of the user.

In a possible implementation, that the first wireless device pairs with the second wireless device based on a password-based authenticated key exchange (PAKE) protocol and by using the first password as an encryption password in a key exchange process includes: The first wireless device sends first information to the second wireless device, where the first information is obtained by the first wireless device by encrypting a first public key by using the first password, and the first information is used by the second wireless device to obtain a first session key based on the first public key: the first wireless device receives second information fed back by the second wireless device in response to the first information, where the second information is obtained by the second wireless device by using the first session key and is used to respond to the first information; and the first wireless device pairs with the second wireless device by using the first password and the second information. The first public key is prestored or generated by the first wireless device.

Optionally, before sending the first information to the second wireless device, the first wireless device encrypts the first public key by using the first password, to obtain the first information. It should be understood that the second wireless device may obtain the first public key by decrypting the first information by using the first password. Optionally, before sending the first information to the second wireless device, the first wireless device encrypts the first public key by using the first password, to obtain first intermediate information, and compresses the first intermediate information to obtain the first information. In other words, the first information is compressed information. In this way, the time spent by the first wireless device in sending information to the second wireless device can be reduced. The first wireless device sends the first information to the second wireless device, so that the second wireless device may accurately obtain the first public key of the first wireless device. Therefore, there is relatively high security. In this implementation, provided that the first wireless device sends only the first information to the second wireless device, the second wireless device can obtain the first session key by using the first information. Therefore, there is a relatively small quantity of information exchange times.

In this implementation, in a process of pairing with the second wireless device, the first wireless device uses the first password as an encryption password in the key exchange process. Therefore, there is relatively high security and a relatively small quantity of information exchange times.

In a possible implementation, the pairing with the second wireless device by using the first password and the second information includes: The first wireless device obtains third information based on the first password and the second information, where the third information is used by the second wireless device to obtain a first random number generated by the first wireless device: the first wireless device sends the third information to the second wireless device; the first wireless device receives fourth information fed back by the second wireless device in response to the third information, where the fourth information is used by the first wireless device to obtain a second random number fed back by the second wireless device for the first random number; and the first wireless device determines, when the first random number is the same as the second random number, that pairing with the second wireless device succeeds.

The second random number may be understood as the first random number that is sent by the second wireless device and that is from the first wireless device. It should be understood that if the second random number is the same as the first random number, it indicates that the second wireless device receives the third information sent by the first wireless device, and correctly obtains, based on the third information, the first random number generated by the first wireless device. Therefore, when the second random number is the same as the first random number, authentication on the second wireless device succeeds (in other words, identity verification succeeds). If the second random number is different from the first random number, it indicates that the second wireless device does not receive the third information sent by the first wireless device, or the second wireless device does not obtain the first random number generated by the first wireless device from the received third information. It should be understood that when the second random number is different from the first random number, authentication on the second wireless device does not succeed (identity verification does not succeed). Therefore, it is determined that pairing with the second wireless device fails.

In this implementation, the second random number is compared with the first random number, to quickly and accurately determine that pairing with the second wireless device succeeds or fails, so as to end a pairing procedure in a timely manner by using the second wireless device.

In a possible implementation, that the first wireless device obtains third information based on the first password and the second information includes: The first wireless device processes the second information by using the first password, to obtain a second public key: the first wireless device obtains a second session key based on the second public key and a first private key; and the first wireless device encrypts the first random number by using the second session key, to obtain the third information.

In this implementation, the second information is processed by using the first password, to quickly obtain the second public key. Therefore, there is relatively high security.

In a possible implementation, that the first wireless device processes the second information by using the first password, to obtain a second public key includes: The first wireless device processes the second information by using the first password, to obtain the second public key and a third random number, where the third random number corresponds to a fourth random number generated by the second wireless device; and that the first wireless device encrypts the first random number by using the second session key, to obtain the third information includes: The first wireless device processes the first random number and the third random number by using the second session key, to obtain the third information, where the third random number is used by the second wireless device to determine to end a pairing procedure with the first wireless device or to continue a pairing procedure with the first wireless device.

Optionally, the first wireless device decrypts the second information by using the first password, to obtain the second public key and the third random number. Optionally, the first wireless device first decompresses the second information to obtain second intermediate information, and then decrypts the second intermediate information by using the first password, to obtain the second public key and the third random number.

In this implementation, the second information that enables the second wireless device to obtain the third random number is sent to the second wireless device, so that the second wireless device determines, in a timely manner, to end the pairing procedure with the first wireless device or to continue the pairing procedure with the first wireless device.

In a possible implementation, before the first wireless device sends the first information to the second wireless device, the method further includes: The first wireless device sends feature exchange acknowledgement information to the second wireless device, where the feature exchange acknowledgement information includes a first encryption algorithm; and the first wireless device encrypts the first public key by using the first password as an encryption password and by using the first encryption algorithm, to obtain the first information.

The feature exchange acknowledgement information may include at least one parameter to be used by the first wireless device and the second wireless device to perform pairing, for example, an encryption algorithm, a decryption algorithm, or a compression algorithm. The first wireless device and the second wireless device may negotiate the parameter to be used for pairing, so that the pairing procedure is performed by using the negotiated parameter. In actual application, the first wireless device and the second wireless device may have different capabilities (for example, support different types of encryption algorithms). Therefore, the first wireless device and the second wireless device need to negotiate the parameter to be used for pairing, so that the two wireless devices can successfully implement information exchange.

In this implementation, the first wireless device sends the feature exchange acknowledgement information to the second wireless device, so that information exchange with the second wireless device can be successfully implemented. Therefore, pairing between wireless devices with different capabilities can be implemented.

In a possible implementation, before the first wireless device sends the feature exchange acknowledgement information to the second wireless device, the method further includes: The first wireless device sends a feature exchange request to the second wireless device; and the first wireless device receives feature exchange response information used by the second wireless device to respond to the feature exchange request, where the feature exchange response information includes at least one parameter to be used by the second wireless device to perform a pairing operation; and that the first wireless device sends feature exchange acknowledgement information to the second wireless device includes: The first wireless device sends the feature exchange acknowledgement information to the second wireless device in response to the feature exchange response information.

In this implementation, the first wireless device may quickly determine the parameter to be used to perform a pairing operation with the second wireless device. Therefore, there is a small quantity of information exchange times.

In a possible implementation, the feature exchange acknowledgement information further includes a second encryption algorithm; and before the first wireless device encrypts the first public key by using the first password as an encryption password and by using the first encryption algorithm, to obtain the first information, the method further includes: The first wireless device performs one-way encryption on private information by using the second encryption algorithm, to obtain the first password, where the private information is shared by the first wireless device and the second wireless device.

In this implementation, the first wireless device may perform one-way encryption on the private information by using the second encryption algorithm negotiated with the second wireless device, to obtain the first password. This is easy to implement, and therefore there is high security.

In a possible implementation, the feature exchange acknowledgement information further includes a first compression algorithm; and that the first wireless device encrypts the first public key by using the first password as an encryption password and by using the first encryption algorithm, to obtain the first information includes: The first wireless device encrypts the first public key by using the first password and the first encryption algorithm, to obtain first intermediate information; and the first wireless device compresses the first intermediate information by using the first compression algorithm, to obtain the first information.

In this implementation, before sending information to the second wireless device, the first wireless device compresses the information to be sent to the second wireless device. In this way, a quantity of information sending times can be reduced, to improve pairing efficiency.

In a possible implementation, that the first wireless device processes the first random number and the third random number by using the second session key, to obtain the third information includes: The first wireless device encrypts the first random number and the third random number by using the second session key, to obtain third intermediate information; and the first wireless device compresses the third intermediate information to obtain the third information.

In this implementation, before sending information to the second wireless device, the first wireless device compresses the information to be sent to the second wireless device. In this way, a quantity of information sending times can be reduced, to improve pairing efficiency.

In a possible implementation, before the first wireless device determines, when the first random number is the same as the second random number, that pairing with the second wireless device succeeds, the method further includes: The first wireless device decompresses the fourth information to obtain fourth intermediate information; and the first wireless device decrypts the fourth intermediate information by using the session key, to obtain the second random number.

In this implementation, before sending information to the second wireless device, the first wireless device decompresses the information to be sent to the second wireless device. In this way, a quantity of information sending times can be reduced, to improve pairing efficiency.

According to a second aspect, an embodiment of this application provides another wireless device pairing method applied to a short-range communication system. The method includes: A second wireless device obtains a first password, where the first password is shared by the second wireless device and a first wireless device; and the second wireless device pairs with the first wireless device based on a password-based authenticated key exchange (PAKE) protocol and by using the first password as an encryption password in a key exchange process. The second wireless device may be a pairing receiver.

In this embodiment, the second wireless device and the first wireless device share the first password, and therefore the second wireless device may pair with the first wireless device based on the PAKE protocol and by using the first password as an encryption password in the key exchange process. In this way, no user input or operation is required, and therefore a time spent in implementing pairing can be reduced, to improve user experience.

In a possible implementation, the first password includes at least one of an account, a password, a digital signature, biometric feature information, a digital certificate, or voice information.

In this implementation, a user may use different information as the first password, in other words, a specific form of the first password is not limited, to meet different requirements of the user.

In a possible implementation, that the second wireless device pairs with the first wireless device based on a password-based authenticated key exchange (PAKE) protocol and by using the first password as an encryption password in a key exchange process includes: The second wireless device receives first information from the first wireless device: the second wireless device processes the first information by using the first password, to obtain a first session key; and the second wireless device pairs with the first wireless device by using the first password and the first session key.

In this implementation, in a process of pairing with the first wireless device, the second wireless device processes the first information by using the first password, to quickly obtain the first session key. Therefore, there is relatively high security and a relatively small quantity of information exchange times.

In a possible implementation, that the second wireless device pairs with the first wireless device by using the first password and the first session key includes: The second wireless device encrypts, by using the first session key, a fourth random number generated by the second wireless device, to obtain a first encrypted random number: the second wireless device encrypts the first encrypted random number by using the first password as an encryption password, to obtain second information: the second wireless device sends the second information to the first wireless device: the second wireless device receives third information fed back by the first wireless device in response to the second information; and the second wireless device pairs with the first wireless device by using the first session key and the third information.

In this implementation, the fourth random number generated by the second wireless device is first encrypted by using the first session key, to obtain the first encrypted random number; and then the first encrypted random number is encrypted by using the first password as an encryption password, to obtain the second information. Therefore, there is high security.

In a possible implementation, that the second wireless device encrypts the first encrypted random number by using the first password as an encryption password, to obtain second information includes: The second wireless device encrypts the first encrypted random number and a second public key by using the first password as an encryption password, to obtain the second information, where the second public key is used by the first wireless device to obtain a second session key, and the second session key is information required by the first wireless device to respond to the second information.

In a possible implementation, that the second wireless device pairs with the first wireless device by using the first session key and the third information includes: The second wireless device processes the third information by using the first session key, to obtain a third random number, where the third random number is a random number fed back by the first wireless device for the fourth random number; and the second wireless device determines, based on the third random number and the fourth random number, to end a pairing procedure with the first wireless device or to continue a pairing procedure with the first wireless device.

In this implementation, the third random number is compared with the fourth random number, to quickly and accurately determine that pairing with the first wireless device succeeds or fails.

In a possible implementation, before the second wireless device processes the first information by using the first password, to obtain the first session key, the method further includes: The second wireless device receives feature exchange acknowledgement information from the first wireless device, where the feature exchange acknowledgement information includes a first decryption algorithm; and that the second wireless device processes the first information by using the first password, to obtain a first session key includes: The second wireless device decrypts the first information by using the first password and the first decryption algorithm, to obtain a first public key; and the second wireless device obtains the first session key based on the first public key and a second private key.

In this implementation, the second wireless device receives the feature exchange acknowledgement information sent by the first wireless device, so that information exchange with the first wireless device can be successfully implemented. Therefore, pairing between wireless devices with different capabilities can be implemented.

In a possible implementation, before the second wireless device receives the feature exchange acknowledgement information from the first wireless device, the method further includes: The second wireless device receives a feature exchange request sent from the first wireless device; and the second wireless device sends feature exchange response information to the first wireless device in response to the feature exchange request, where the feature exchange response information includes at least one parameter to be used by the second wireless device to perform a pairing operation, and the feature exchange acknowledgement information is information fed back by the first wireless device in response to the feature exchange response information.

In this implementation, the first wireless device may quickly determine the parameter to be used to perform a pairing operation with the second wireless device. Therefore, there is a small quantity of information exchange times.

In a possible implementation, the feature exchange acknowledgement information further includes a second encryption algorithm; and before the second wireless device pairs with the first wireless device based on the password-based authenticated key exchange (PAKE) protocol and by using the first password as an encryption password in the key exchange process, the method further includes: The second wireless device performs one-way encryption on private information by using the second encryption algorithm, to obtain the first password, where the private information is shared by the first wireless device and the second wireless device.

In this implementation, the first wireless device may perform one-way encryption on the private information by using the second encryption algorithm negotiated with the second wireless device, to obtain the first password. This is easy to implement, and therefore there is high security.

In a possible implementation, the feature exchange acknowledgement information further includes a first decompression algorithm; and that the second wireless device processes the first information by using the first password, to obtain a first session key includes: The second wireless device decompresses the first information by using the first decompression algorithm, to obtain first intermediate information; and the second wireless device processes the first intermediate information by using the first password, to obtain the first session key.

In a possible implementation, that the second wireless device processes the third information by using the first session key, to obtain a third random number includes: The second wireless device decompresses the third information to obtain third intermediate information; and the second wireless device decrypts the third information by using the first session key, to obtain the third random number.

In this implementation, compressed information is transmitted between the first wireless device and the second wireless device. Therefore, a quantity of information sending times can be reduced, to improve pairing efficiency.

In a possible implementation, that the second wireless device determines, based on the third random number and the fourth random number, to end a pairing procedure with the first wireless device or to continue a pairing procedure with the first wireless device includes: The second wireless device determines, when the third random number is different from the fourth random number, to end the pairing procedure with the first wireless device: or the second wireless device sends fourth information that is fed back in response to the third information to the first wireless device when the third random number is the same as the fourth random number, where the fourth information is used by the first wireless device to determine that pairing with the second wireless device succeeds or fails.

Optionally, the fourth information is information obtained by the second wireless device by encrypting a second random number by using the first session key, and the second random number is a random number fed back by the second wireless device for a first random number from the first wireless device. For example, the second wireless device processes the third information to obtain the first random number generated by the first wireless device.

In this implementation, the third random number is compared with the fourth random number, to quickly and accurately determine that pairing with the first wireless device succeeds or fails.

According to a third aspect, an embodiment of this application provides a wireless device, including: a processing module, configured to obtain a first password, where the first password is shared by the first wireless device and a second wireless device, where the processing module is further configured to pair with the second wireless device based on a password-based authenticated key exchange (PAKE) protocol and by using the first password as an encryption password in a key exchange process; and a transceiver module, configured to implement, under control of the processing module, a transceiver operation in a process of pairing with the second wireless device.

In a possible implementation, the first password includes at least one of an account, a password, a digital signature, biometric feature information, a digital certificate, or voice information.

In a possible implementation, the transceiver module is specifically configured to send first information to the second wireless device, where the first information is information obtained by the first wireless device by encrypting a first public key by using the first password, and the first information is used by the second wireless device to obtain a first session key based on the first public key; and receive second information fed back by the second wireless device in response to the first information, where the second information is information that is obtained by the second wireless device by using the first session key and that is used to respond to the first information; and the processing module is specifically configured to pair with the second wireless device by using the first password and the second information.

In a possible implementation, the processing module is specifically configured to obtain third information based on the first password and the second information, where the third information is used by the second wireless device to obtain a first random number generated by the first wireless device: the transceiver module is further configured to send the third information to the second wireless device under control of the processing module; and receive fourth information fed back by the second wireless device in response to the third information, where the fourth information is used by the first wireless device to obtain a second random number fed back by the second wireless device for the first random number; and the processing module is specifically configured to determine, when the first random number is the same as the second random number, that pairing with the second wireless device succeeds.

In a possible implementation, the processing module is specifically configured to: process the second information by using the first password, to obtain a second public key: obtain a second session key based on the second public key and a first private key; and encrypt the first random number by using the second session key, to obtain the third information.

In a possible implementation, the processing module is specifically configured to: process the second information by using the first password, to obtain the second public key and a third random number, where the third random number corresponds to a fourth random number generated by the second wireless device; and process the first random number and the third random number by using the second session key, to obtain the third information, where the third random number is used by the second wireless device to determine to end a pairing procedure with the first wireless device or to continue a pairing procedure with the first wireless device.

In a possible implementation, the transceiver module is further configured to send feature exchange acknowledgement information to the second wireless device, where the feature exchange acknowledgement information includes a first encryption algorithm; and the processing module is further configured to encrypt the first public key by using the first password as an encryption password and by using the first encryption algorithm, to obtain the first information.

In a possible implementation, the feature exchange acknowledgement information further includes a second encryption algorithm; and the processing module is further configured to perform, one-way encryption on private information by using the second encryption algorithm, to obtain the first password, where the private information is shared by the first wireless device and the second wireless device.

For technical effects brought by the third aspect or the implementations, refer to the description of the technical effects of the first aspect or the corresponding implementations.

According to a fourth aspect, an embodiment of this application provides a wireless device, including: a processing module, configured to obtain a first password, where the first password is shared by the second wireless device and a first wireless device, where the processing module is further configured to pair with the first wireless device based on a password-based authenticated key exchange (PAKE) protocol and by using the first password as an encryption password in a key exchange process; and a transceiver module, configured to implement, under control of the processing module, a transceiver operation in a process of pairing with the first wireless device.

In a possible implementation, the first password includes at least one of an account, a password, a digital signature, biometric feature information, a digital certificate, or voice information.

In a possible implementation, the transceiver module is specifically configured to receive first information from the first wireless device; and the processing module is specifically configured to: process the first information by using the first password, to obtain a first session key; and pair with the first wireless device by using the first password and the first session key.

In a possible implementation, the processing module is specifically configured to: encrypt, by using the first session key, a fourth random number generated by the second wireless device, to obtain a first encrypted random number; and encrypt the first encrypted random number by using the first password as an encryption password, to obtain second information: the transceiver module is specifically configured to: send the second information to the first wireless device; and receive third information fed back by the first wireless device in response to the second information; and the processing module is specifically configured to pair with the first wireless device by using the first session key and the third information.

In a possible implementation, the processing module is specifically configured to encrypt the first encrypted random number and a second public key by using the first password as an encryption password, to obtain the second information, where the second public key is used by the first wireless device to obtain a second session key, and the second session key is information required by the first wireless device to respond to the second information.

In a possible implementation, the processing module is specifically configured to: process the third information by using the first session key, to obtain a third random number, where the third random number is a random number fed back by the first wireless device for the fourth random number; and determine, based on the third random number and the fourth random number, to end a pairing procedure with the first wireless device or to continue a pairing procedure with the first wireless device.

In a possible implementation, the transceiver module is further configured to receive feature exchange acknowledgement information from the first wireless device, where the feature exchange acknowledgement information includes a first decryption algorithm; and the processing module is specifically configured to: decrypt the first information by using the first password and the first decryption algorithm, to obtain a first public key; and obtain the first session key based on the first public key and a second private key.

In a possible implementation, the feature exchange acknowledgement information further includes a second encryption algorithm; and the processing module is further configured to perform one-way encryption on private information by using the second encryption algorithm, to obtain the first password, where the private information is shared by the first wireless device and the second wireless device.

For technical effects brought by the fourth aspect or the implementations, refer to the description of the technical effects of the second aspect or the corresponding implementations.

According to a fifth aspect, an embodiment of this application provides another wireless device, including a processor and a memory. The processor and the memory are connected to each other. The memory is configured to store a computer program, and the computer program includes program instructions. The processor is configured to invoke the program instructions to perform the method in the first aspect.

According to a sixth aspect, an embodiment of this application provides another wireless device, including a processor and a memory. The processor and the memory are connected to each other. The memory is configured to store a computer program, and the computer program includes program instructions. The processor is configured to invoke the program instructions to perform the method in the second aspect.

According to a seventh aspect, an embodiment of this application provides a computer-readable storage medium. The computer storage medium stores a computer program, and the computer program includes program instructions. When the program instructions are executed by a processor, the processor is enabled to perform the method in the first aspect.

According to an eighth aspect, an embodiment of this application provides a computer-readable storage medium. The computer storage medium stores a computer program, and the computer program includes program instructions. When the program instructions are executed by a processor, the processor is enabled to perform the method in the second aspect.

According to a ninth aspect, an embodiment of this application provides a short-range communication system. The short-range communication system includes the wireless device in any one of the first aspect and the optional implementations and the wireless device in any one of the second aspect and the optional implementations.

According to a tenth aspect, a chip is provided. The chip includes a processor and a communication interface, and the processor is coupled to the communication interface, and is configured to implement the method provided in any one of the first aspect or the optional implementations.

According to an eleventh aspect, a chip is provided. The chip includes a processor and a communication interface, and the processor is coupled to the communication interface, and is configured to implement the method provided in any one of the second aspect or the optional implementations.

According to a twelfth aspect, an embodiment of this application provides a computer program product. The computer program product includes program instructions, and when the program instructions are executed by a processor, the processor is enabled to perform the method in any one of the first aspect and the optional implementations.

According to a thirteenth aspect, an embodiment of this application provides a computer program product. The computer program product includes program instructions, and when the program instructions are executed by a processor, the processor is enabled to perform the method in any one of the second aspect and the optional implementations.

DESCRIPTION OF EMBODIMENTS

Figure 1:
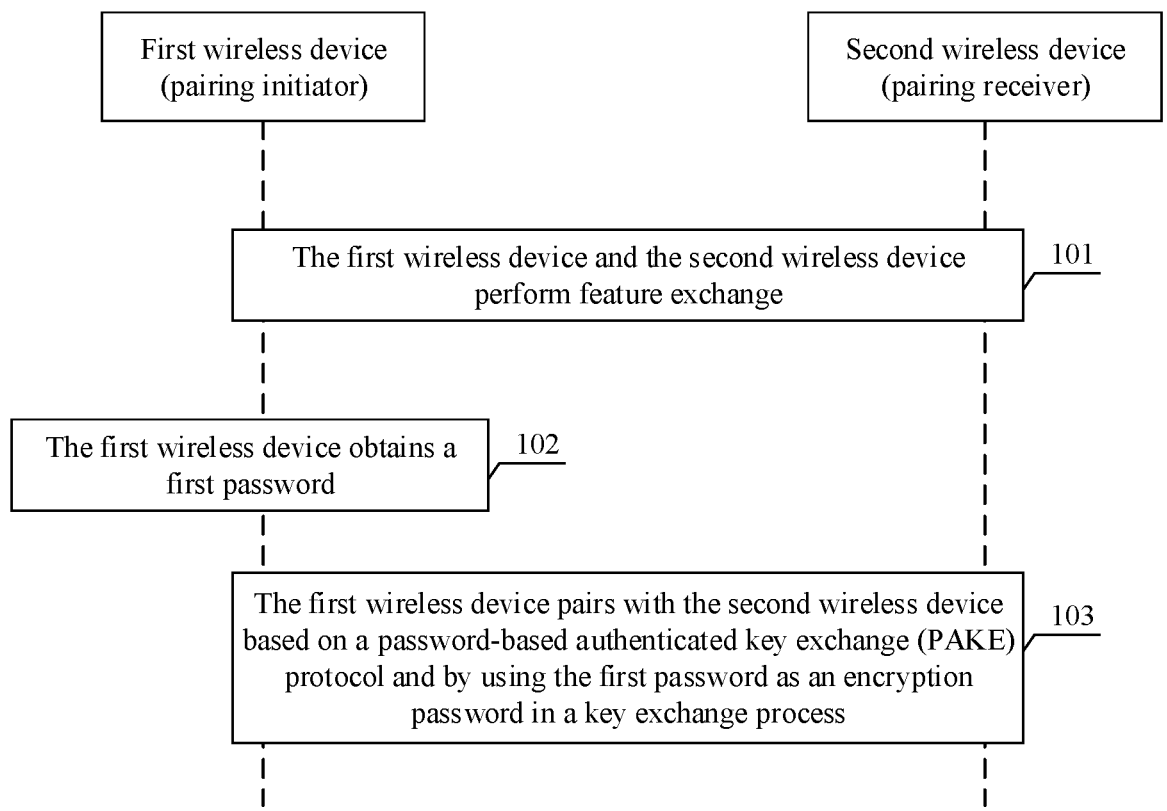
FIG. 1 is a flowchart of a pairing method applied to a short-range communication system according to an embodiment of this application.

As described in the background, currently, in a commonly used pairing method, for example, Bluetooth pairing, applied to a short-range communication system, information exchange needs to be performed for a plurality of times to implement pairing and connection, and consequently it takes a relatively long time to complete pairing and connection. For a user that has an increasingly high requirement, there is relatively poor experience. Conventional Bluetooth simple pairing is used as an example. From a phase of discovering each other to a phase of completing pairing by two wireless devices, message exchange needs to be performed for many times and even many user operations need to be performed, and a public key exchange procedure needs to be performed in a pairing process. In the public key exchange procedure, the two parties exchange public keys with each other. A length of the public key is 48 bytes or 64 bytes. In this case, the public key can be unidirectionally transmitted by using three or four messages (a maximum length of valid data that can be transmitted in a Bluetooth standard control packet is 16 bytes). In consideration of the fact that a peer device also needs to transmit the public key to a local device and three or four messages are also required, in the pairing process, at least a time for transmitting six (or eight) messages is usually required. If calculation is performed based on the condition that 50 milliseconds is required to transmit one message, approximately 300 milliseconds or 400 milliseconds is required. This is a quite long time and imposes significant impact on actual user experience. Currently, in a common number comparison pairing manner, air interface message exchange needs to be performed for five times, and users of two parties need to perform operations such as tapping and determining on prompt numbers. Similarly, if calculation is performed based on the condition that 50 milliseconds is required to perform message exchange for one time, 250 milliseconds is required to perform air interface message exchange for five times. This does not include a user operation and a delay in message sending or receiving. In a passkey entry pairing manner, there are also disadvantages, for example, it takes a long time to perform air interface messages exchange, and a user operation is required. In other words, in all currently used pairing methods applied to a short-range communication system, there are disadvantages of a complex pairing procedure and a long time that is spent. Therefore, a pairing method with a shorter pairing time, namely, a quick pairing method, needs to be studied.

It is found, by studying a plurality of currently used pairing procedures, that a main reason for a relatively long time spent by two wireless devices in implementing pairing is a relatively large quantity of message exchange times and a relatively long message transmission time. A reason for the relatively large quantity of message exchange times is that to ensure security, in a pairing process, the two wireless devices need to perform message exchange for a plurality of times, to confirm that the peer devices are trusted devices. Embodiments of this application provide a pairing method applicable to two or more trusted devices, to quickly implement pairing between two or more wireless devices, in other words, a quick pairing method is provided. In this application, the two or more trusted devices are wireless devices that store one or more pieces of same private information and/or a first password. A main principle of the pairing method applied to a short-range communication system provided in this application is as follows: Quick pairing is implemented by using a first password shared between a plurality of wireless devices, to reduce message exchange operations performed to verify that the peer devices are trusted devices. The pairing method applied to a short-range communication system provided in embodiments of this application is applicable to a short-range communication scenario in which two or more wireless devices share a same first password. The short-range communication system may be a system including two or more Bluetooth devices (for example, mobile phones), a system including a wireless hotspot and a terminal device (for example, a mobile phone or a tablet computer), or another communication system. The short-range communication scenario in which two or more wireless devices share a same first password is described below.

In the short-range communication scenario in which two or more wireless devices share a same first password, each wireless device stores or can obtain the first password. For example, each wireless device performs one-way encryption on private information, to generate a first password (which is subsequently referred to as a password), and performs encrypted transmission on an air interface message by using the first password, to protect secure transmission of encrypted information. In addition, a PAKE protocol is used to authenticate a random number generated by a peer device, to ensure that identities of the two communication parties are authentic and reliable, so as to implement pairing. Optionally, a relatively long message such as a public key and a random number in the air interface message is transmitted in a lossless encryption manner, to reduce an air interface message transmission time and increase a pairing speed. The pairing method applied to a short-range communication system provided in embodiments of the application is described below.

FIG. 1 is a flowchart of a pairing method applied to a short-range communication system according to an embodiment of this application. As shown in FIG. 1, the method includes the following steps.

101. A first wireless device and a second wireless device perform feature exchange. A main objective of step 101 is to enable two devices (namely, the first wireless device and the second wireless device) to notify each other of capabilities of the peer devices, and a pairing initiator (namely, the first wireless device) finally determines a parameter to be used to perform pairing, for example, a supported encryption algorithm or a supported lossless compression algorithm. An implementation of step 101 is subsequently described in detail. The first wireless device may be an electronic device that initiates pairing, namely, a pairing initiator. The second wireless device may be an electronic device that receives pairing, namely, a pairing receiver. The first wireless device may be a mobile phone, a wearable device (for example, a wristband or a watch), a tablet computer, a speaker, a smart home appliance, or the like. The second wireless device is the same as or different from the first wireless device. For example, the first wireless device is a mobile phone, and the second wireless device is a smart band. For another example, both the first wireless device and the second wireless device are mobile phones.

102. The first wireless device obtains a first password.

The first password includes at least one of an account, a password, a digital signature, biometric feature information, a digital certificate, or voice information. The first password is shared by the first wireless device and the second wireless device. The first wireless device obtains the first password in the following manner: The first wireless device may obtain the prestored first password (namely, a password): the first wireless device may obtain the first password by performing processing by using private information and an encryption algorithm: the first wireless device may obtain the first password from another device (for example, a server) by using a network: or the first wireless device may obtain the first password in another manner. This is not limited in this application. For example, the first wireless device and the second wireless device generate the first password by performing a hash operation by using information in a same account system (for example, login can be performed on different devices by using a Huawei account (a user name and/or a password) or a Tencent account). For another example, the first wireless device and the second wireless device respectively collect biometric feature information of a same user, and generate the first password by using the biometric feature information respectively collected by the first wireless device and the second wireless device. The biometric feature information is unique, and therefore biometric feature information collected by all devices is the same. Therefore, the first wireless device and the second wireless device may generate a same password (namely, the first password) by using the biometric feature information respectively collected by the first wireless device and the second wireless device. In some embodiments, the first password is generated by the first wireless device by performing one-way encryption by using the private information, so that encrypted transmission is performed on an air interface message by using the first password. The second wireless device may also store or can obtain the first password. The first password is generated by the second wireless device by performing one-way encryption by using the private information. In other words, the first wireless device and the second wireless device may encrypt and/or decrypt to-be-transmitted data by using the first password in a pairing process.

103. The first wireless device pairs with the second wireless device based on a password-based authenticated key exchange (PAKE) protocol and by using the first password as an encryption password in a key exchange process.

In an embodiment, a possible implementation of step 103 is as follows: The first wireless device sends first information to the second wireless device, where the first information is information obtained by the first wireless device by encrypting a first public key by using the first password, and the first information is used by the second wireless device to obtain a first session key based on the first public key: the first wireless device receives second information fed back by the second wireless device in response to the first information, where the second information is obtained by the second wireless device by using the first session key and is used to respond to the first information; and the first wireless device pairs with the second wireless device by using the first password and the second information. A parameter (for example, an encryption algorithm or a compression algorithm) used in a process of pairing with the second wireless device by the first wireless device is the parameter determined in step 101. An example of a complete procedure of step 103 is subsequently described with reference to the accompanying drawings.

In this embodiment, the first wireless device and the second wireless device share the first password, and therefore the first wireless device may pair with the second wireless device based on the PAKE protocol and by using the first password as an encryption password in the key exchange process. In this way, no user input or operation is required, and therefore a time spent in implementing pairing can be reduced, to improve user experience.

A procedure of performing feature exchange between the first wireless device and the second wireless device, namely, an implementation of step 101, is described below.

Figure 2:
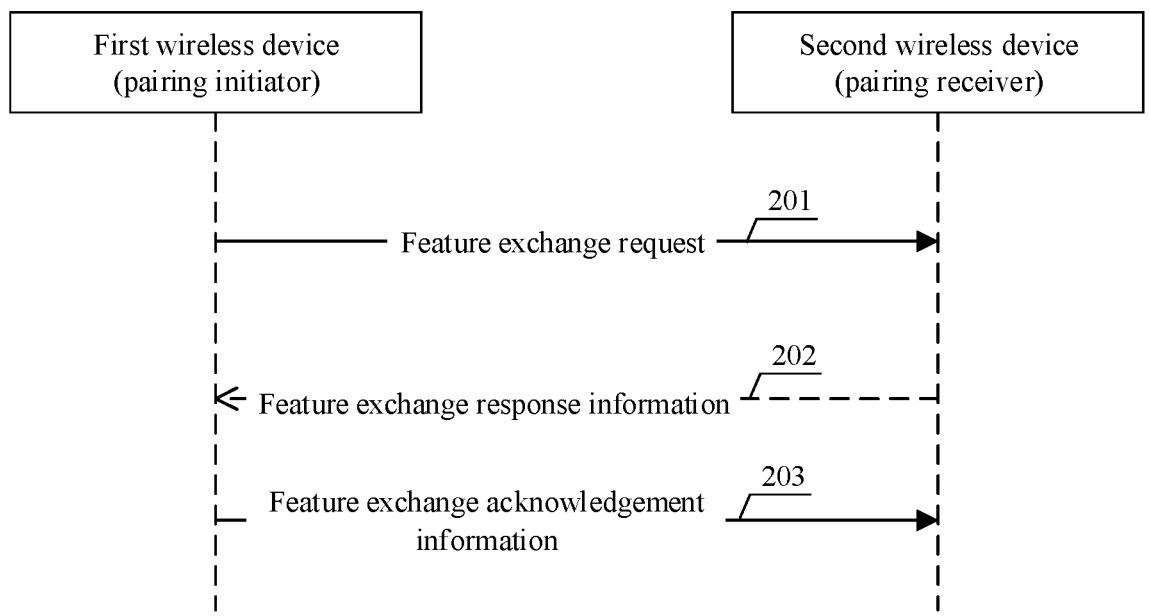
FIG. 2 is a flowchart of feature exchange according to an embodiment of this application.

FIG. 2 is a flowchart of feature exchange according to an embodiment of this application. FIG. 2 is an embodiment of step 101. As shown in FIG. 2, the feature exchange procedure includes the following steps.

201. The first wireless device sends a feature exchange request to the second wireless device.

202. The second wireless device sends feature exchange response information to the first wireless device in response to the feature exchange request.

The feature exchange response information includes at least one parameter that may be used by the second wireless device to perform a pairing operation. Optionally, when a quick pairing feature is supported, the second wireless device sends the feature exchange response information to the first wireless device in response to the feature exchange request; or when a quick pairing feature is not supported, sends a reject message or a message type unsupported message to the first wireless device in response to the feature exchange request. The reject message or the message type unsupported message is used to indicate that the second wireless device does not support the quick pairing feature. The quick pairing feature means that the second wireless device stores or can obtain the first password, and can perform the pairing method in FIG. 1.

203. The first wireless device sends feature exchange acknowledgement information.

The feature exchange acknowledgement information is used to indicate at least one parameter to be used by the first wireless device to pair with the second wireless device.

For example, parameters included in messages in the feature exchange procedure are shown in Table 1:

TABLE 1

| Sequence number | Message | Parameter and meaning |
|---|---|---|
| 1 | Feature exchange request | Used to request the second wireless device to send the at least one parameter to be used for pairing |
| 2 | Feature exchange response information | Message parameter 1: type list of supported lossless compression algorithms; Message parameter 2: list of one-way encryption algorithms for password generation; Message parameter 3: list of algorithms for encrypting a message in pairing by using a password (passcode); Message parameter 4: list of algorithms for encrypting a message by using a session key; and Message parameter 5: ID identifier of a password that is used to distinguish between different passwords |
| 3 | Feature exchange acknowledgement | 1. Final selection of a lossless compression algorithm from the message parameter 1 in the feature exchange response; 2. Final selection of a one-way encryption algorithm from the message parameter 2 in the feature exchange response; |

TABLE 1-continued

| Sequence number | Message | Parameter and meaning |
|---|---|---|
| | | 3. Final selection of an encryption algorithm from the message parameter 3 in the feature exchange response; |
| | | 4. Final selection of an encryption algorithm from the message parameter 4 in the feature exchange response; and |
| | | 5. Determine an ID of a finally selected password. |

In the feature exchange procedure, the pairing initiator (namely, the first wireless device) first initiates the feature exchange request; if a peer device (namely, the second wireless device) supports the quick pairing feature, the peer device replies with the feature exchange response information after receiving the feature exchange request; or if the peer device does not support the quick pairing feature, the peer device replies with the reject message or the message type unsupported message; and after receiving the feature exchange response, the pairing initiator sends the feature exchange acknowledgement message to notify a message parameter for subsequent quick pairing, namely, the at least one parameter to be used for pairing.

In this embodiment, the first wireless device and the second wireless device may quickly determine, by performing the procedure in FIG. 2, the at least one parameter to be used for pairing. Therefore, signaling interaction is performed for a relatively small quantity of times.

A possible implementation of step 103 is described below with reference to the accompanying drawings.

Figure 3A:
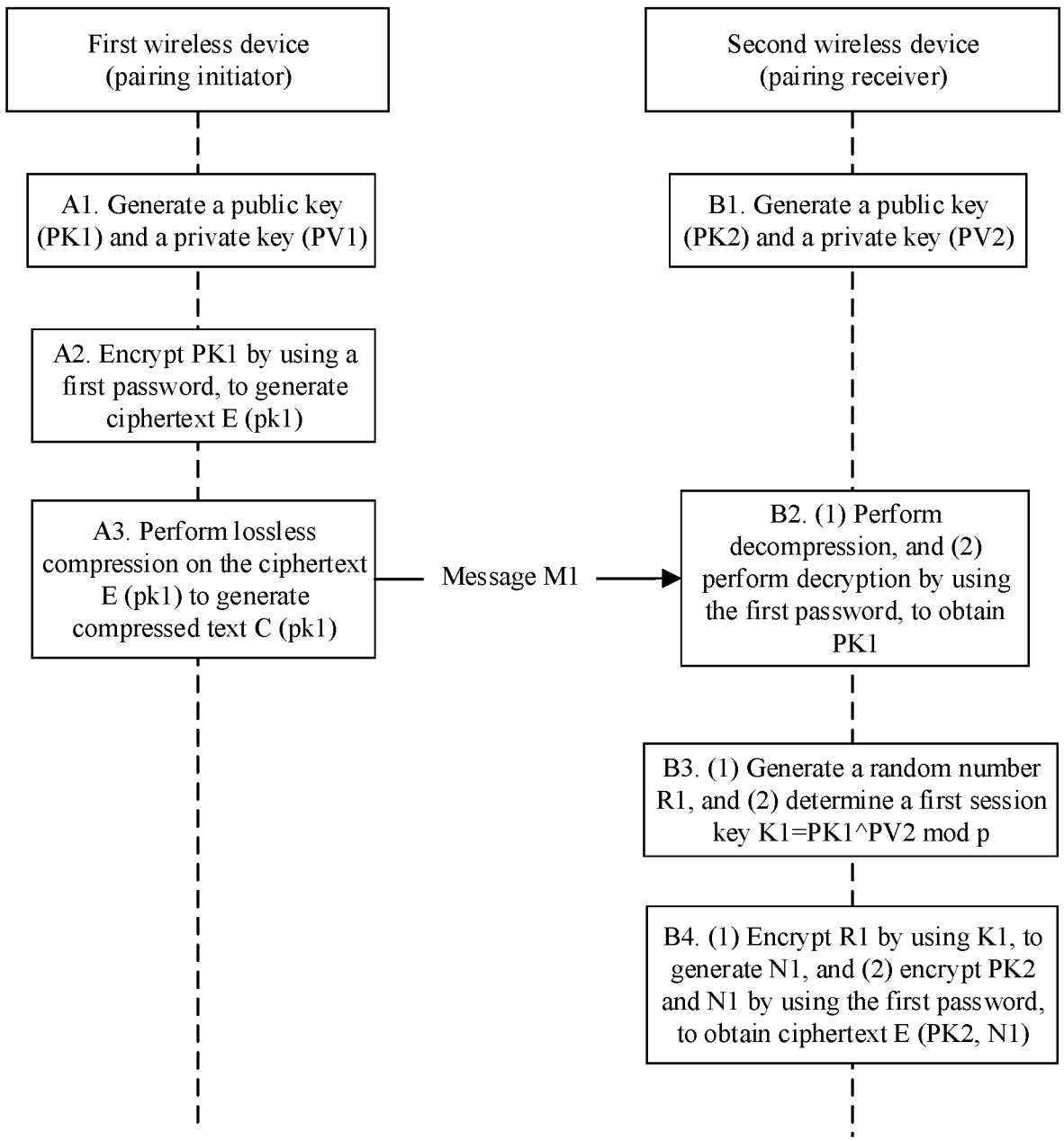
FIG. 3A to FIG. 3C are a flowchart of another pairing method applied to a short-range communication system according to an embodiment of this application.
Figure 3B:
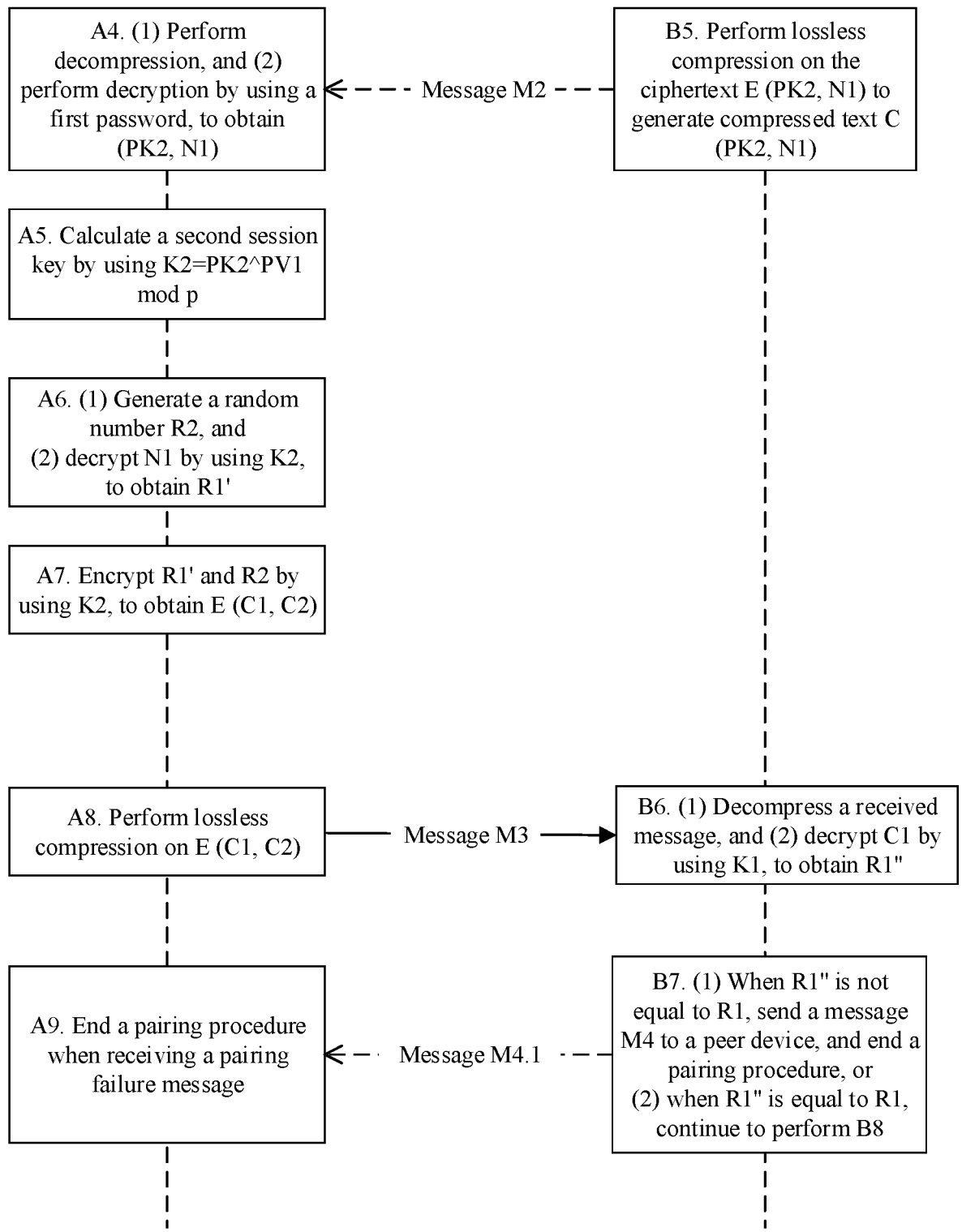
Figure 3C:
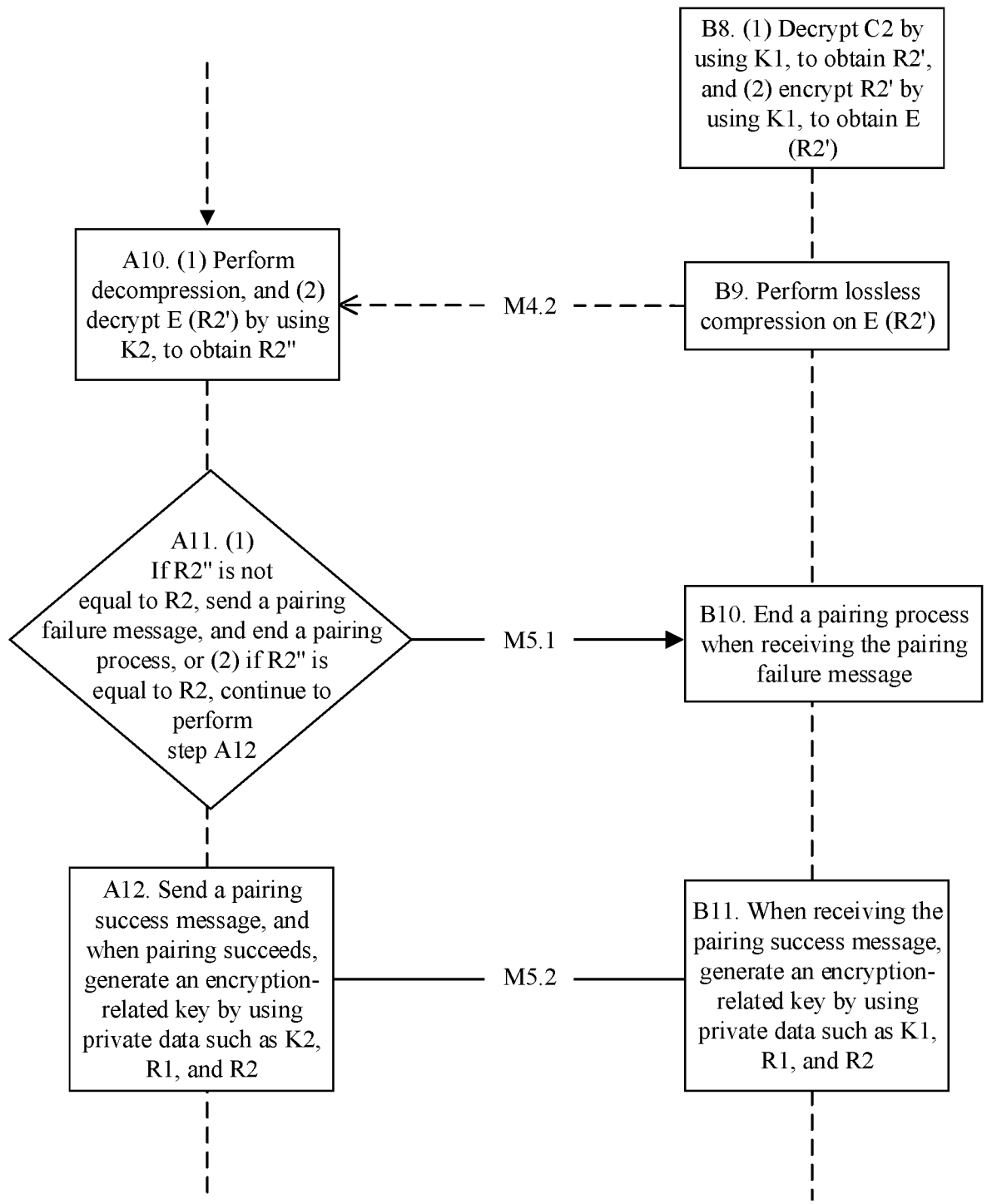

FIG. 3A to FIG. 3C are a flowchart of a pairing method applied to a short-range communication system according to an embodiment of this application. FIG. 3A, FIG. 3B, and FIG. 3C constitute a complete flowchart of the pairing method applied to a short-range communication system, in other words, FIG. 3A to FIG. 3C are an embodiment of step 103. As shown in FIG. 3A to FIG. 3C, the pairing procedure includes the following steps.

A1. The first wireless device generates the first public key PK1 and a first private key PV1.

The first public key matches the first private key. In other words, the first wireless device generates a password pair. A public key and a private key are a password pair (namely, a public key and a private key) obtained by using an algorithm. The public key is a public part of the password pair, and the private key is a non-public part. For example, the first public key PK1 and the first private key PV1 generated by the first wireless device meet the following formula:

$$y = g^x \bmod p \quad (1), \text{where}$$

y represents a public key (for example, the first public key), x represents a private key (for example, the first private key), g is a production, and p is a large prime number. Both the production g and the prime number p are public.

For example, $15 = 3^x \bmod 17$. In this case, x=6, where 15 is a public key, x=6 is a private key, g is 3, and p is a prime number 17. It should be understood that there is actually a more complex algorithm for generating a password pair, and only a simple example is provided herein to facilitate understanding of a principle of the algorithm for generating a password pair. It should be understood that the first wireless device may generate the first public key PK1 and the first private key PV1 by using any algorithm. This is not limited in this embodiment.

A2. The first wireless device encrypts the first public key by using the first password, to obtain first ciphertext E (pk1).

In some embodiments, the first wireless device stores the first password. In some embodiments, the first password is generated by using private information before step A2 is performed. In some embodiments, the first wireless device encrypts the first public key by using a first encryption algorithm and by using the first password as an encryption password, to obtain the first ciphertext. The first encryption algorithm is an algorithm that is used for encrypting a public key and that is negotiated by the first wireless device and the second wireless device through feature exchange, namely, the algorithm that is used for encrypting a public key and that is negotiated in step 101.

A3. The first wireless device compresses (for example, performs lossless compression on) the first ciphertext to obtain first compressed text C (pk1), and sends the first compressed text to the second wireless device.

Optionally, A3 may be replaced with the following step: The first wireless device sends the first ciphertext to the second wireless device. A message M1 (corresponding to the first information) in FIG. 3A is the first compressed text or the first ciphertext.

B1. The second wireless device generates a second public key PK2 and a second private key PV2.

The second public key matches the second private key. In other words, the second wireless device generates a password pair. A sequence of performing step B1 and step A1 to step A3 is not limited. In other words, there is no sequence between B1 and step A1, step A2, and step A3. An implementation of step B1 may be the same as the implementation of step A1. In other words, the first wireless device and the second wireless device generate the password pair by using a same algorithm. For example, the first wireless device generates the first public key and the first private key by using the formula (1), and the second wireless device generates the second public key and the second private key by using the formula (1).

B2. The second wireless device receives the first compressed text, decompresses the first compressed text to obtain the first ciphertext, and decrypts the first ciphertext by using the first password, to obtain the first public key PK1.

In some embodiments, the second wireless device receives the first compressed text, first decompresses the first compressed text to obtain the first ciphertext, and then decrypts the first ciphertext by using the first password, to obtain the first public key. In some embodiments, the second wireless device receives the first ciphertext, and decrypts the first ciphertext by using the first password, to obtain the first public key. In some embodiments, the second wireless device stores the first password. In some embodiments, the first password is generated by using private information before step B2 is performed.

B3. The second wireless device generates a random number R1 (corresponding to a fourth random number), and determines the first session key by using the first public key PK1 and the second private key PV2.

The random number R1 may be an integer randomly generated by the second wireless device, for example, a 256-bit integer or a 128-bit integer. For example, a formula for determining the first session key by using the first public key PK1 and the second private key PV2 is as follows:

$$K1 = PK1 \char`^ PV2 \bmod p \quad (2),\text{ where}$$

PK1 represents the first public key, PV2 represents the second private key, and p is a large public prime number (namely, a known prime number). For example, PK2 is 3, PV1 is 6, and p is 17. In this case, K1=PK2^PV1 mod 17=3^6 mod 17=15.

B4. The second wireless device encrypts the random number R1 by using the first session key, to obtain N1 (corresponding to a first encrypted random number), and encrypts the second public key PK2 and N1 by using the first password, to obtain E (PK2, N1).

B5. The second wireless device performs lossless compression on E (PK2, N1) to obtain compressed text C (PK2, N1), and sends the compressed text C (PK2, N1) to the first wireless device.

The step in which the second wireless device performs lossless compression on E (PK2, N1) is optional and is not necessary. In some embodiments, the second wireless device sends E (PK2, N1) instead of C (PK2, N1) to the first wireless device. A message M2 (corresponding to the second information) in FIG. 3B is E (PK2, N1) or C (PK2, N1).

A4. The first wireless device decompresses received C (PK2, N1) to obtain E (PK2, N1), and decrypts E (PK2, N1) by using the first password, to obtain the second public key PK2 and N1.

A5. The first wireless device determines a second session key by using the second public key and the first private key.

For example, a formula used by the first wireless device to determine the second session key by using the second public key and the first private key is as follows:

$$K2 = PK2 \char`^ PV1 \bmod p \quad (3),\text{ where}$$

PK2 represents the second public key, PV1 represents the first private key, and p is a large public prime number (namely, a known prime number). In some embodiments, both the first wireless device and the second wireless device generate the password pair by using the formula (1). In other words, PK1, PV1, and p meet the following formula: $PK1 = g^{PV1} \bmod p$, and PK2, PV2, and p meet the following formula: $PK2 = g^{PV2} \bmod p$. After $PK2 = g^{PV2} \bmod p$ is substituted into the formula (3), it is obtained that K2=($g^{PV2}$ mod p) ^PV1 mod p, and after $PK1 = g^{PV1} \bmod p$ is substituted into the formula (2), it may be obtained that K1=($g^{PV1}$ mod p)^PV2 mod p. A same session key is calculated by using the formula (2) and the formula (3) because ($g^{PV2}$ mod p)^PV1 mod p and ($g^{PV1}$ mod p)^PV2 mod p are equal. It may be understood that the first session key K1 determined by the second wireless device by using the first public key and the second private key PV2 in step B3 is the same as the second session key K2 determined by the first wireless device by using the second public key and the first private key in step A5. In other words, the first wireless device and the second wireless device may generate a same session key. It should be understood that the formula (3) is an example used to determine the second session key. The first wireless device may determine the second session key by using an asymmetric encryption algorithm such as a Diffie-Hellman key exchange algorithm or ECDH, or may determine the second session key in another manner. This is not limited in this application.

A6. The first wireless device generates a random number R2 (corresponding to a first random number), and decrypts N1 by using the first session key, to obtain a random number R1' (corresponding to a second random number).

A7. The first wireless device encrypts the random number R1' and the random number R2 by using the first session key, to obtain E (C1, C2).

A8. The first wireless device performs lossless compression on E (C1, C2), and sends compressed text C (C1, C2) obtained through compression to the second wireless device.

The step in which the first wireless device performs lossless compression on E (C1, C2) is optional and is not necessary. Step A8 may be replaced with the following step: The first wireless device sends E (C1, C2) to the second wireless device. A message M3 (corresponding to third information) in FIG. 3B is E (C1, C2) or C (C1, C2).

B6. The second wireless device decompresses a received message (corresponding to the third information) to obtain E (C1, C2), namely, C1 and C2, and decrypts C1 by using the first session key, to obtain R1" (corresponding to a third random number).

B7. When R1" is not equal to R1, the second wireless device sends a first pairing failure message, or when R1" is equal to R1, continues to perform step B8.

The first pairing failure message is used to indicate that pairing between the first wireless device and the second wireless device fails, or is used to indicate the first wireless device to end the pairing procedure with the second wireless device. A message M4.1 in FIG. 3B is the first pairing failure message. It may be understood that when R1" is not equal to R1, it indicates that the first wireless device does not successfully obtain R1 through decryption or an error occurs in data transmission between the first wireless device and the second wireless device. If R1" is not equal to R1 due to the fact that the first wireless device does not successfully obtain R1 through decryption, it indicates that the first wireless device is not a trusted device (in other words, does not store or does not obtain the first password), and therefore the pairing procedure needs to be ended. If R1" is not equal to R1 due to the fact that an error occurs in data transmission between the first wireless device and the second wireless device, it indicates that communication quality cannot be ensured between the first wireless device and the second wireless device, and there is no need to complete pairing. By performing step B7, the second wireless device may quickly end the pairing procedure with the first wireless device. Therefore, unnecessary operations are reduced, and power consumption is reduced.

B8. The second wireless device decrypts C2 by using the first session key, to obtain R2' (corresponding to the second random number), and encrypts R2' by using the first session key, to obtain E (R2').

B9. The second wireless device performs lossless compression on E (R2') to obtain second compressed text, and sends the second compressed text to the first wireless device. A message M4.2 (corresponding to fourth information) in FIG. 3C is the second compressed text or E (R2').

A9. When receiving the first pairing failure message, the first wireless device ends the pairing procedure with the second wireless device.

A10. The first wireless device decompresses the second compressed text to obtain E (R2'), and decrypts E (R2') by using the second session key, to obtain R2" (namely, the second random number).

A11. When R2 is not equal to R2", the first wireless device sends a second pairing failure message, and ends a pairing procedure, or when R2 is equal to R2", performs step A12.

A message M5.1 in FIG. 3C is the second pairing failure message.

A12. The first wireless device sends a pairing success message, and generates, by using private data, an encryption key used for data encryption.

A message M5.2 in FIG. 3C is the pairing success message.

B10. When receiving the second pairing failure message, the second wireless device ends the pairing procedure with the first wireless device.

B11. When receiving the pairing success message, the second wireless device generates, by using private data, an encryption key used for data encryption.

Manners of generating the encryption key used for data encryption in step B11 and step A12 may be the same. It should be understood that the first wireless device and the second wireless device may generate a same key, namely, the encryption key, by using same private data (for example, R1 and R2) and a same algorithm.

In the pairing procedure, the public key may be exchanged by using an asymmetric encryption algorithm, for example, Diffie-Hellman key exchange or elliptic-curve Diffie-Hellman (ECDH) key exchange. In actual application, a key exchange algorithm used to exchange the public key may be determined by using the feature exchange procedure in FIG. 2. The random number R1 and the random number R2 may be generated by using a secure random number generation algorithm. In the pairing procedure, whether to use compressed transmission is determined by using the feature exchange procedure in FIG. 2. A compressed transmission manner is used only when two trusted devices support a same compression algorithm. After the first wireless device and the second wireless device are successfully paired, the two parties jointly hold information such as the session key K, the random numbers R1 and R2, and MAC addresses (Media Access Control Address) of the two communication parties, and both the two parties may generate, based on these parameters, the encryption key used for data encryption. For various wireless specifications, a manner of generating the encryption key may be consistent with that in an original standard as much as possible. In this way, a pairing process may be independently integrated into an original security architecture.

In the pairing method procedure in FIG. 3A to FIG. 3C, a PAKE protocol may be used. Provided that two pairing parties hold same private information such as a private account or biometric feature information or a same first password, quick pairing can be performed between trusted devices of a user in a perception-free manner. It should be understood that FIG. 3A to FIG. 3C are merely an example of the pairing method procedure, and other solutions for implementing quick pairing by using a password shared by two devices are also solutions claimed for protection in this application. The solutions are not listed one by one herein.

In this embodiment, the first wireless device and the second wireless device share the first password, and therefore both the first wireless device and the second wireless device are trusted devices for the user. Therefore, the first wireless device and the second wireless device may perform the quick pairing procedure in FIG. 3A to FIG. 3C, to increase a pairing speed. In this embodiment, sharing private information may mean that two or more wireless devices store same private information or can obtain same private information. In this embodiment, sharing a first password may mean that two or more wireless devices store a same password or can obtain a same password, for example, generate a same password.

It should be understood that both the first wireless device and the second wireless device are trusted devices for the user. Therefore, in comparison with a current pairing procedure, in the pairing procedure provided in this embodiment, a quantity of message exchange times is reduced, and a message transmission time is further reduced by compressing a transmitted message. Therefore, a time spent in implementing pairing can be reduced, to improve user experience.

Figure 4:
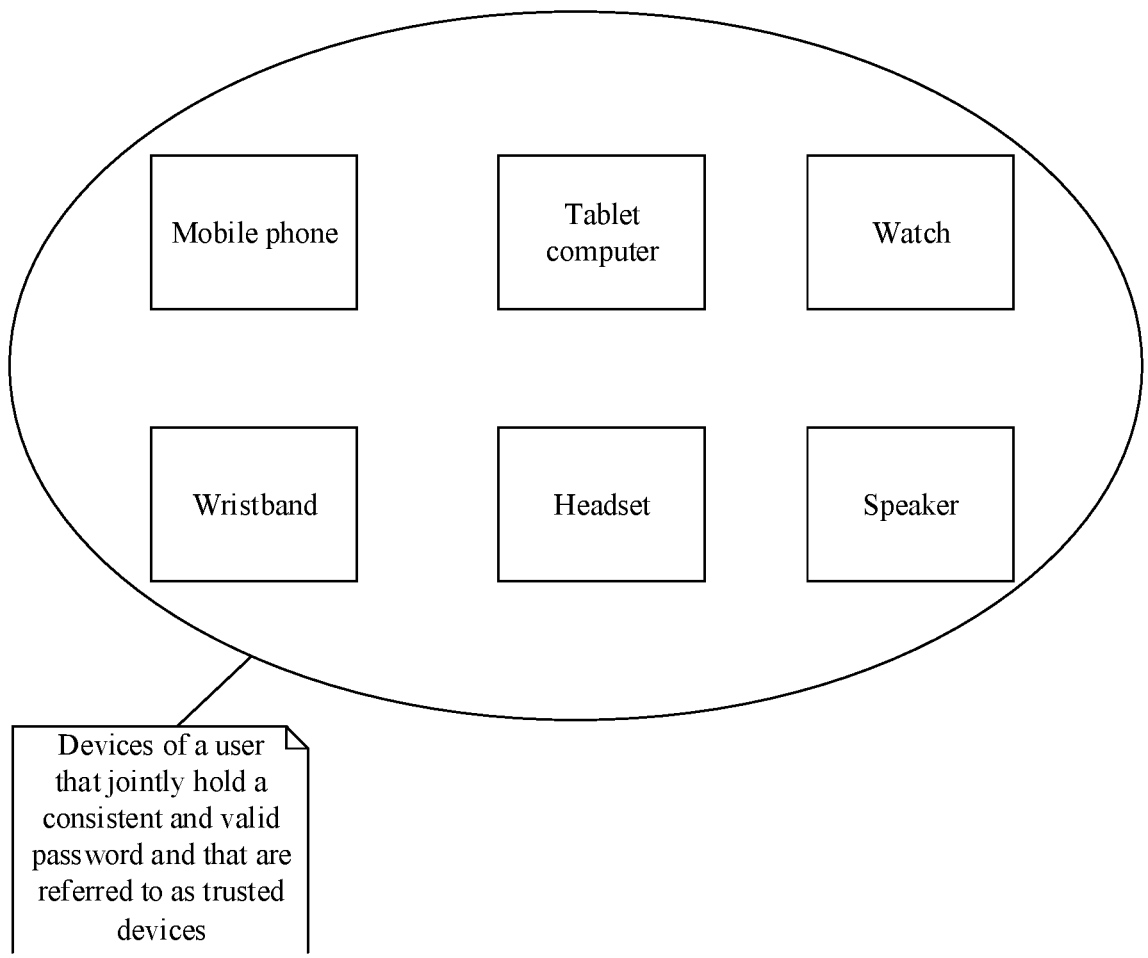
FIG. 4 is a schematic diagram of a trusted device list of a user according to an embodiment of this application.

The pairing method procedure provided in embodiments of this application is applicable to pairing between a plurality of trusted devices, namely, two or more wireless devices that share a same password. It should be understood that only devices trusted by a user store one or more pieces of private information or one or more passwords (for example, passwords) that are exactly the same. In other words, for the user, the two or more wireless devices that share the same password are trusted, and therefore can be quickly paired. FIG. 4 is a schematic diagram of a trusted device list of a user according to an embodiment of this application. For example, all wireless devices in FIG. 4 hold a same and valid password (namely, a password). In other words, devices of the user that jointly hold a consistent and valid password (passcode) are trusted devices. In some embodiments, the password (passcode) jointly held by the trusted devices is not a "password" that usually needs to be entered by the user, but is generated by performing one-way encryption (for example, one-way hash) on private information. The private information is information such as biometric feature information (for example, a biometric fingerprint or iris of the user), a user name and a password, a digital signature, or a digital certificate. In some embodiments, the trusted device of the user is dynamic. When the password (passcode) of the user is obtained by a device in a manner (transmitted in a wireless or wired manner, read from a memory card device, generated by the device by performing one-way encryption on the private information, or the like), the device is considered as a trusted device of the user. When the device cannot obtain the password or the password is invalid, the device is deleted from the trusted device list of the user. From a perspective of the user, the user maintains the trusted device list, and the quick pairing procedure provided in this embodiment may be performed between any two devices in the trusted device list.

In the foregoing embodiment, the first wireless device and the second wireless device share the first password. That is, the first wireless device and the second wireless device jointly hold a consistent and valid password (passcode). An implementation of generating a password based on private information is described below by using the first wireless device as an example.

Figure 5:
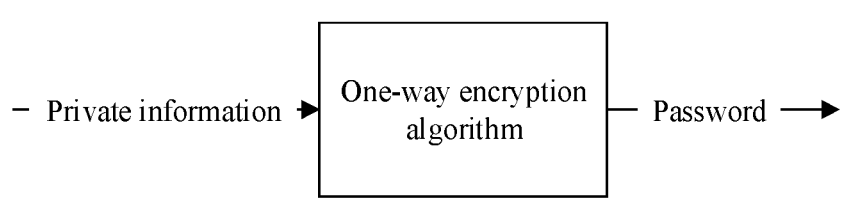
FIG. 5 is a schematic diagram of generating a password based on private information according to an embodiment of this application.

FIG. 5 is a schematic diagram of generating a password based on private information according to an embodiment of this application. As shown in FIG. 5, a first wireless device may generate a password by using a secure one-way encryption algorithm such as MD or SHA and private information. In some embodiments, two wireless devices may mutually independently generate or obtain a password (namely, a first password) before performing pairing by using the pairing method procedure in FIG. 3A to FIG. 3C. In some embodiments, a password jointly held by trusted devices (corresponding to the first wireless device and a second wireless device) is generated in a manner in FIG. 5. It should be understood that after generating or obtaining the same password, the two wireless devices may implement quick pairing by using the pairing method procedure provided in embodiments of this application.

A specific application scenario is described below to describe how a plurality of trusted devices of a user implement quick pairing in a perception-free manner.

Application scenario 1: When a user enables a quick pairing function of a first wireless device for the first time, the first wireless device displays a private information input interface, the user enters private information, and the first wireless device generates a first password by using the received private information. When the user enables a quick pairing function of a second wireless device for the first time, the second wireless device displays a private information input interface, the user enters the same private information, and the second wireless device generates the first password by using the received private information. In other words, the user needs to enter same private information on devices that support quick pairing, so that the devices that support quick pairing can generate and store a same password. When the quick pairing function is enabled for the first wireless device and the second wireless device, the first wireless device and the second wireless device may implement pairing by using the quick pairing method procedure in FIG. 3A to FIG. 3C. The private information may be an account, biometric feature information, a digital signature, a digital certificate, or the like. In actual application, when enabling a quick pairing function of a wireless device, the user needs to enter private information, so that the wireless device generates a password required for implementing quick pairing.

Application scenario 2: When a user enables a quick pairing function of a first wireless device for the first time, the first wireless device displays a password input interface, the user enters a password (namely, a first password), and the first wireless device stores the password entered by the user. When the user enables a quick pairing function of a second wireless device for the first time, the second wireless device displays a password input interface, the user enters the same password (namely, the first password), and the second wireless device stores the password entered by the user. In other words, the user needs to enter a same password on devices that support quick pairing. When the pairing function is enabled for both the first wireless device and the second wireless device, the first wireless device and the second wireless device may implement pairing by using the quick pairing method procedure in FIG. 3A to FIG. 3C.

The user may use another manner to enable the devices that support the quick pairing function to obtain same private information or a same password, so as to implement the pairing method procedure provided in embodiments of this application. In actual application, the user may set a device as a trusted device based on a requirement of the user, and correspondingly add the device to a trusted device list; and may set a trusted device as an untrusted device, and correspondingly may delete the device from the trusted device list. In actual application, after a pairing function is enabled for any two trusted devices, pairing may be quickly completed. In other words, provided that two communication parties hold shared private information or a shared password, pairing can be quickly implemented. The pairing method procedure is based on a PAKE protocol, and may support lossless compression transmission for a message such as a public key transmitted through an air interface. Therefore, a time for transmitting a message through the air interface is greatly reduced, and there is a high anti-interference capability for pairing.

An implementation of generating, by using private data, an encryption key used for data encryption is described in detail in the foregoing embodiments. An example of generating a password used for data encryption is described below with reference to the accompanying drawings.

Figure 6:
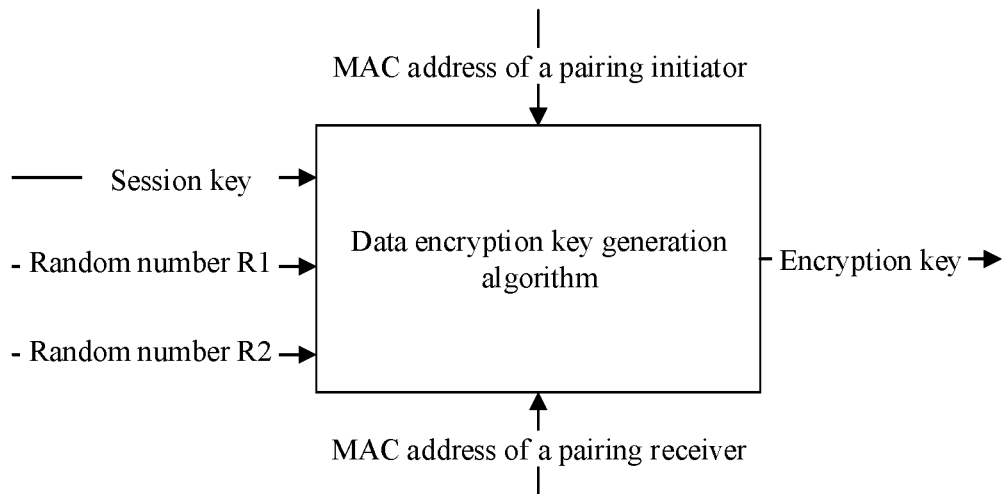
FIG. 6 is a schematic diagram of generating, by using private data, an encryption key used for data encryption according to an embodiment of this application.

FIG. 6 is a schematic diagram of generating, by using private data, an encryption key used for data encryption according to an embodiment of this application. As shown in FIG. 6, successfully paired wireless devices may generate an encryption key by using a data encryption key generation algorithm and private data such as a session key K, a random number R1, a random number R2, and MAC addresses of two pairing parties. The session key K may be obtained by the wireless devices by using an asymmetric key exchange algorithm such as Diffie-Hellman key exchange or ECDH.

After the first wireless device and the second wireless device are successfully paired, the two parties jointly hold private data such as the session key K, the random number R1, the random number R2, and the MAC addresses (Media Access Control Address) of the two communication parties, and the first wireless device and the second wireless device may generate, based on these parameters, the encryption key used for data encryption. For various wireless specifications, a manner of generating the data encryption key may be consistent with that in an original standard as much as possible. In this way, a pairing process may be independently integrated into an original security architecture.

Figure 7:
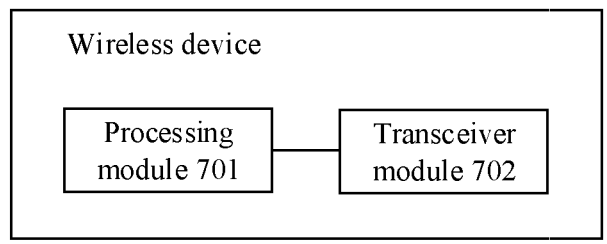
FIG. 7 is a schematic diagram of a structure of a wireless device according to an embodiment of this application.

Functions implemented by modules in a first wireless device in a pairing process are described below with reference to a schematic diagram of a structure of the first wireless device. FIG. 7 is a schematic diagram of a structure of a wireless device according to an embodiment of this application. As shown in FIG. 7, the wireless device includes:

a processing module 701, configured to obtain a first password, where the first password is shared by the first wireless device and a second wireless device, where
the processing module 701 is further configured to pair with the second wireless device based on a password-based authenticated key exchange (PAKE) protocol and by using the first password as an encryption password in a key exchange process; and
a transceiver module 702, configured to implement, under control of the processing module, a transceiver operation in a process of pairing with the second wireless device.

In a possible implementation, the first password includes at least one of an account, a password, a digital signature, biometric feature information, a digital certificate, or voice information.

In a possible implementation, the transceiver module 702 is specifically configured to: send first information to the second wireless device, where the first information is information obtained by the first wireless device by encrypting a first public key by using the first password, and the first information is used by the second wireless device to obtain a first session key based on the first public key; and receive second information fed back by the second wireless device in response to the first information, where the second information is information that is obtained by the second wireless device by using the first session key and that is used to respond to the first information; and the processing module 701 is specifically configured to pair with the second wireless device by using the first password and the second information.

In a possible implementation, the processing module 701 is specifically configured to obtain third information based on the first password and the second information, where the third information is used by the second wireless device to obtain a first random number generated by the first wireless device:

the transceiver module 702 is further configured to: send the third information to the second wireless device under control of the processing module; and receive fourth information fed back by the second wireless device in response to the third information, where the fourth information is used by the first wireless device to obtain a second random number fed back by the second wireless device for the first random number; and the processing module 701 is specifically configured to determine, when the first random number is the same as the second random number, that pairing with the second wireless device succeeds.

In a possible implementation, the processing module 701 is specifically configured to: process the second information by using the first password, to obtain a second public key; obtain a second session key based on the second public key and a first private key; and encrypt the first random number by using the second session key, to obtain the third information.

In a possible implementation, the processing module 701 is specifically configured to: process the second information by using the first password, to obtain the second public key and a third random number, where the third random number corresponds to a fourth random number generated by the second wireless device; and process the first random number and the third random number by using the second session key, to obtain the third information, where the third random number is used by the second wireless device to determine to end a pairing procedure with the first wireless device or to continue a pairing procedure with the first wireless device.

In a possible implementation, the transceiver module 702 is further configured to send feature exchange acknowledgement information to the second wireless device, where the feature exchange acknowledgement information includes a first encryption algorithm; and the processing module 701 is further configured to encrypt the first public key by using the first password as an encryption password and by using the first encryption algorithm, to obtain the first information.

In a possible implementation, the feature exchange acknowledgement information further includes a second encryption algorithm; and the processing module 701 is further configured to perform, one-way encryption on private information by using the second encryption algorithm, to obtain the first password, where the private information is shared by the first wireless device and the second wireless device.

It should be understood that the wireless device in FIG. 7 may be the first wireless device in the foregoing embodiment. The transceiver module 702 may implement a message sending operation and/or a message receiving operation of the first wireless device, and the processing module 701 may implement an operation other than message sending and message receiving, for example, data encryption, data decryption, data compression, and data decompression. For example, the transceiver module 702 may include a sending module and a receiving module. The sending module and the receiving module may be different functional modules, or may be a same functional module, but can implement different functions. For example, the transceiver module may alternatively be implemented as a transceiver, and the processing module may alternatively be implemented as a processor. Alternatively, the sending module may be implemented as a sender, and the receiving module may be implemented as a receiver. The sender and the receiver may be different functional modules, or may be a same functional module, but can implement different functions.

Figure 8:
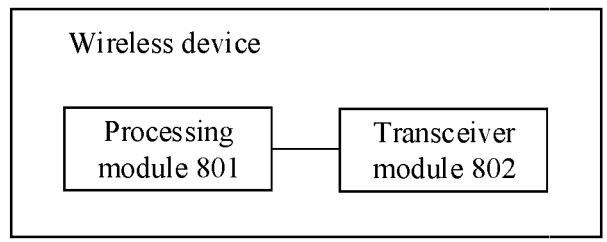
FIG. 8 is a schematic diagram of a structure of another wireless device according to an embodiment of this application.

Functions implemented by modules in a second wireless device in a pairing process are described below with reference to a schematic diagram of a structure of the second wireless device. FIG. 8 is a schematic diagram of a structure of a second wireless device according to an embodiment of this application. As shown in FIG. 8, the wireless device includes:

a processing module 801, configured to obtain a first password, where the first password is shared by the second wireless device and a first wireless device, where the processing module 801 is further configured to pair with the first wireless device based on a password-based authenticated key exchange (PAKE) protocol and by using the first password as an encryption password in a key exchange process; and a transceiver module 802, configured to implement, under control of the processing module, a transceiver operation in a process of pairing with the first wireless device.

In a possible implementation, the first password includes at least one of an account, a password, a digital signature, biometric feature information, a digital certificate, or voice information.

In a possible implementation, the transceiver module 802 is specifically configured to receive first information from the first wireless device; and the processing module 801 is specifically configured to: process the first information by using the first password, to obtain a first session key; and pair with the first wireless device by using the first password and the first session key.

In a possible implementation, the processing module 801 is specifically configured to: encrypt, by using the first session key, a fourth random number generated by the second wireless device, to obtain a first encrypted random number; and encrypt the first encrypted random number by using the first password as an encryption password, to obtain second information:

the transceiver module 802 is specifically configured to: send the second information to the first wireless device; and receive third information fed back by the first wireless device in response to the second information; and the processing module 801 is specifically configured to pair with the first wireless device by using the first session key and the third information.

In a possible implementation, the processing module 801 is specifically configured to encrypt the first encrypted random number and a second public key by using the first password as an encryption password, to obtain the second information, where the second public key is used by the first wireless device to obtain a second session key, and the second session key is information required by the first wireless device to respond to the second information.

In a possible implementation, the processing module 801 is specifically configured to: process the third information by using the first session key, to obtain a third random number, where the third random number is a random number fed back by the first wireless device for the fourth random number; and determine, based on the third random number and the fourth random number, to end a pairing procedure with the first wireless device or to continue a pairing procedure with the first wireless device.

In a possible implementation, the transceiver module 802 is further configured to receive feature exchange acknowledgement information from the first wireless device, where the feature exchange acknowledgement information includes a first decryption algorithm; and the processing module 801 is specifically configured to: decrypt the first information by using the first password and the first decryption algorithm, to obtain a first public key; and obtain the first session key based on the first public key and a second private key.

In a possible implementation, the feature exchange acknowledgement information further includes a second encryption algorithm; and the processing module 801 is further configured to perform one-way encryption on private information by using the second encryption algorithm, to obtain the first password, where the private information is shared by the first wireless device and the second wireless device.

The wireless device in FIG. 8 may be the second wireless device in the foregoing embodiment. The transceiver module 802 may implement a message sending operation and/or a message receiving operation of the second wireless device, and the processing module 801 may implement an operation other than message sending and message receiving of the second wireless device, for example, data encryption, data decryption, data compression, and data decompression. The first wireless device is a pairing initiator, and the second wireless device is a pairing receiver. For example, the transceiver module 802 may include a sending module and a receiving module. The sending module and the receiving module may be different functional modules, or may be a same functional module, but can implement different functions. For example, the transceiver module may alternatively be implemented as a transceiver, and the processing module may alternatively be implemented as a processor. Alternatively, the sending module may be implemented as a sender, and the receiving module may be implemented as a receiver. The sender and the receiver may be different functional modules, or may be a same functional module, but can implement different functions.

In some embodiments, a wireless device may be used only as a pairing initiator, and a structure of the wireless device is the same as that of the wireless device in FIG. 7; and a wireless device may be used only as a pairing receiver, and a structure of the wireless device is the same as that of the wireless device in FIG. 8. In some embodiments, a wireless device may be used as both a pairing initiator and a pairing receiver. In other words, the wireless device may implement a function of the first wireless device and a function of the second wireless device. An embodiment of this application further provides another wireless device, and a structure of the wireless device is the same as that of the wireless device in FIG. 7. A transceiver module 702 may further implement a function of the transceiver module 802, and a processing module 701 may further implement a function of the processing module 801. It should be understood that the wireless device may be used as a pairing initiator (corresponding to the first wireless device) to initiate a pairing procedure, and may be further used as a pairing receiver (corresponding to the second wireless device) to receive a pairing procedure initiated by a pairing initiator.

Figure 9:
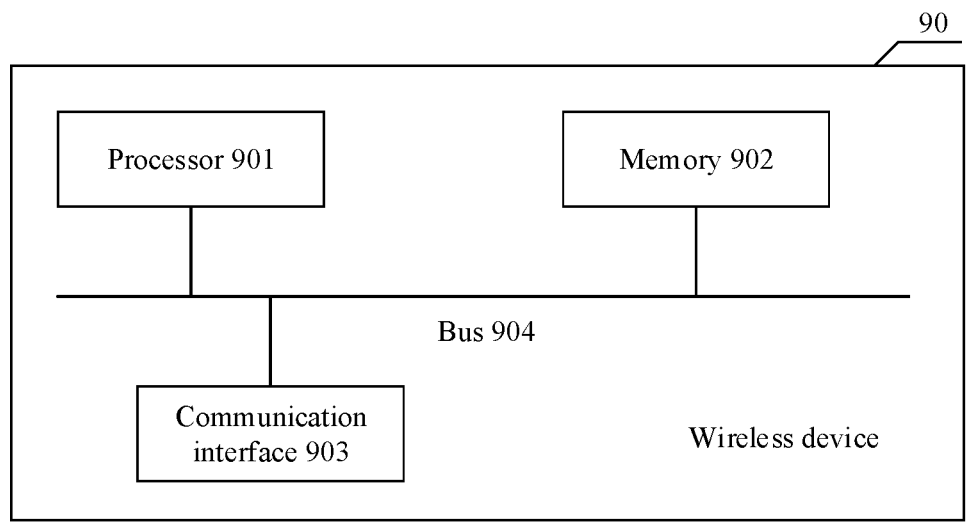
FIG. 9 is a schematic diagram of a structure of still another wireless device according to an embodiment of this application.

FIG. 9 is a schematic diagram of a structure of still another wireless device according to an embodiment of this application. As shown in FIG. 9, the wireless device 90 includes a processor 901, a memory 902, and a communication interface 903. The processor 901, the memory 902, and the communication interface 903 are connected to each other by using a bus. The wireless device in FIG. 9 may be the first wireless device or the second wireless device in the foregoing embodiment.

The memory 902 includes but is not limited to a random access memory (RAM), a read-only memory (ROM), an erasable programmable read-only memory (EPROM), or a portable read-only memory (CDROM). The memory 902 is configured to store related instructions and data. The communication interface 903 is configured to receive and send data. The communication interface 903 may implement a function of the transceiver module 702 in FIG. 7, or may implement a function of the transceiver module 802 in FIG. 8.

The processor 901 may be one or more central processing units (CPU). When the processor 901 is one CPU, the CPU may be a single-core CPU or a multi-core CPU. Specifically, the processor 901 may implement a function of the processing module 701 in FIG. 7, or may implement a function of the processing module 801 in FIG. 8.

The processor 901 in the wireless device 90 is configured to read program code stored in the memory 902, to perform the pairing method procedure in the foregoing embodiment. The wireless device 90 may read the program code stored in the memory 902, to perform the operation performed by the first wireless device and/or the second wireless device in the foregoing embodiment, so as to implement pairing.

An embodiment of this application provides a computer-readable storage medium. The computer-readable storage medium stores a computer program. When the computer program is executed by a processor, the pairing method applied to a short-range communication system provided in the foregoing embodiment is implemented.

An embodiment of this application provides a computer program product including instructions. When the computer program product is run on a computer, the computer is enabled to perform the pairing method applied to a short-range communication system provided in the foregoing embodiment.

It should be understood that, the processor mentioned in embodiments of this application may be a central processing unit (CPU), or may be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

It may be further understood that the memory mentioned in embodiments of this application may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. Through example but not limitative description, a plurality of forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA, or another programmable logic device, discrete gate or transistor logic device, or discrete hardware component, the memory (a storage module) is integrated into the processor.

It should be noted that the memory described in this specification is intended to include but not limited to these memories and any memory of another appropriate type.

It should be further understood that, "first", "second", "third", "fourth", and various numbers in this specification are merely used for differentiation for ease of description, and are not intended to limit the scope of embodiments of this application.

It should be understood that the term "and/or" in this specification describes only an association relationship between associated objects and represents that three relationships may exist. For example, A and/or B may represent any one of the three cases: Only A exists, both A and B exist, or only B exists. In addition, the character "/" in this specification generally indicates an "or" relationship between the associated objects.

It should be understood that sequence numbers of the foregoing processes do not mean execution sequences in various embodiments of this application. Execution sequences of the processes should be determined based on functions and internal logic of the processes, and should not be construed as any limitation on the implementation processes of embodiments of this application.

A person of ordinary skill in the art may be aware that, in combination with the examples described in embodiments disclosed in this specification, modules and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and module, refer to a corresponding process in the foregoing method embodiments, and details are not described herein again.

In several embodiments provided in this application, it should be understood that the disclosed system, apparatus, and method may be implemented in another manner. For example, the described apparatus embodiment is merely an example. For example, division into the modules is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

The modules described as separate parts may or may not be physically separate, and parts displayed as modules may or may not be physical modules, may be located in one position, or may be distributed on a plurality of network modules. Some or all the modules may be selected based on an actual requirement to achieve the objectives of the solutions of the embodiments.

In addition, functional modules in this application may be integrated into one processing module, or each of the modules may exist alone physically, or two or more modules are integrated into one module.

When the functions are implemented in the form of a software functional module and sold or used as an independent product, the functions may be stored in a computer-readable storage medium. Based on such understanding, the technical solutions of this application essentially, or the part contributing to the conventional technology, or some of the technical solutions may be implemented in a form of a software product. The software product is stored in a storage medium, and includes several instructions for instructing a computer device (which may be a personal computer, a server, or a network device) to perform all or some of the steps of the methods described in embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A pairing method applied to a short-range communication system including a first wireless device and a second wireless device, comprising:
    obtaining, by the first wireless device, a first password, wherein the first password is shared by the first wireless device and the second wireless device; and
    pairing, by the first wireless device, with the second wireless device based on a password-based authenticated key exchange (PAKE) protocol and by using the first password as an encryption password in a key exchange process,
    the pairing with the second wireless device based on a password-based authenticated key exchange (PAKE) protocol and by using the first password as an encryption password in a key exchange process comprises:
    sending by the first wireless device, first information to the second wireless device, wherein the first information is obtained by the first wireless device by encrypting a first public key by using the first password, and the first information is used by the second wireless device to obtain a first session key based on the first public key;
    receiving, by the first wireless device, second information fed back by the second wireless device in response to the first information, wherein the second information is obtained by the second wireless device by using the first session key and is used to respond to the first information; and obtaining, by the first wireless device, third information based on the first password and the second information, wherein the third information is used by the second wireless device to obtain a first random number generated by the first wireless device.

2. The method according to claim 1, wherein the first password comprises at least one of an account, a password, a digital signature, biometric feature information, a digital certificate, or voice information.

3. The method according to claim 1, wherein the pairing with the second wireless device based on a password-based authenticated key exchange (PAKE) protocol and by using the first password as an encryption password in a key exchange process further comprises:

pairing, by the first wireless device, with the second wireless device by using the first password and the second information.

4. The method according to claim 3, wherein the pairing with the second wireless device by using the first password and the second information comprises:

sending, by the first wireless device, the third information to the second wireless device;

receiving, by the first wireless device, fourth information fed back by the second wireless device in response to the third information, wherein the fourth information is used by the first wireless device to obtain a second random number fed back by the second wireless device for the first random number; and determining, by the first wireless device when the first random number is the same as the second random number, that pairing with the second wireless device succeeds.

5. The method according to claim 4, wherein the obtaining, by the first wireless device, third information based on the first password and the second information comprises:

processing, by the first wireless device, the second information by using the first password, to obtain a second public key;

obtaining, by the first wireless device, a second session key based on the second public key and a first private key; and encrypting, by the first wireless device, the first random number by using the second session key, to obtain the third information.

6. The method according to claim 5, wherein the processing, by the first wireless device, the second information by using the first password, to obtain a second public key comprises:

processing, by the first wireless device, the second information by using the first password, to obtain the second public key and a third random number, wherein the third random number corresponds to a fourth random number generated by the second wireless device; and the encrypting, by the first wireless device, the first random number by using the second session key, to obtain the third information comprises:

processing, by the first wireless device, the first random number and the third random number by using the second session key, to obtain the third information, wherein the third random number is used by the second wireless device to determine to end a pairing procedure with the first wireless device or to continue a pairing procedure with the first wireless device.

7. The method according to claim 3, wherein before the sending, by the first wireless device, first information to the second wireless device, the method further comprises:

sending, by the first wireless device, feature exchange acknowledgement information to the second wireless device, wherein the feature exchange acknowledgement information comprises a first encryption algorithm; and encrypting, by the first wireless device, the first public key by using the first password as an encryption password and by using the first encryption algorithm, to obtain the first information.

8. The method according to claim 7, wherein the feature exchange acknowledgement information further comprises a second encryption algorithm; and before the encrypting, by the first wireless device, the first public key by using the first password as an encryption password and by using the first encryption algorithm, to obtain the first information, the method further comprises:

performing, by the first wireless device, one-way encryption on private information by using the second encryption algorithm, to obtain the first password, wherein the private information is shared by the first wireless device and the second wireless device.

9. A wireless device pairing method applied to a short-range communication system including a first wireless device and a second wireless device, comprising:

obtaining, by the second wireless device, a first password, wherein the first password is shared by the second wireless device and the first wireless device; and pairing, by the second wireless device, with the first wireless device based on a password-based authenticated key exchange (PAKE) protocol and by using the first password as an encryption password in a key exchange process, the pairing, by the second wireless device, with the first wireless device based on a password-based authenticated key exchange (PAKE) protocol and by using the first password as an encryption password in a key exchange process comprises:

receiving, by the second wireless device, first information from the first wireless device;

processing, by the second wireless device, the first information by using the first password, to obtain a first session key;

encrypting, by the second wireless device by using the first session key, a fourth random number generated by the second wireless device, to obtain a first encrypted random number; and encrypting, by the second wireless device, the first encrypted random number by using the first password as an encryption password, to obtain second information for pairing.

10. The method according to claim 9, wherein the first password comprises at least one of an account, a password, a digital signature, biometric feature information, a digital certificate, or voice information.

11. The method according to claim 9, wherein the pairing, by the second wireless device, with the first wireless device based on a password-based authenticated key exchange (PAKE) protocol and by using the first password as an encryption password in a key exchange process comprises:

pairing, by the second wireless device, with the first wireless device by using the first password and the first session key.

12. The method according to claim 11, wherein the pairing, by the second wireless device, with the first wireless device by using the first password and the first session key comprises:
sending, by the second wireless device, the second information to the first wireless device;
receiving, by the second wireless device, third information fed back by the first wireless device in response to the second information; and
pairing, by the second wireless device, with the first wireless device by using the first session key and the third information.

13. The method according to claim 12, wherein the encrypting, by the second wireless device, the first encrypted random number by using the first password as an encryption password, to obtain second information comprises:
encrypting, by the second wireless device, the first encrypted random number and a second public key by using the first password as an encryption password, to obtain the second information, wherein the second public key is used by the first wireless device to obtain a second session key, and the second session key is information required by the first wireless device to respond to the second information.

14. A wireless device, comprising:
at least one processor, configured to obtain a first password, wherein the first password is shared by the wireless device and another wireless device, wherein
the at least one processor is further configured to pair with the another wireless device based on a password-based authenticated key exchange (PAKE) protocol and by using the first password as an encryption password in a key exchange process;
wherein the at least one processor is further configured to obtain third information based on the first password and second information, wherein the third information is used by the another wireless device to obtain a first random number generated by the wireless device; and
a transceiver, configured to implement, under control of the at least one processor, a transceiver operation in a process of pairing with the another wireless device, the transceiver being further configured to,
send first information to the another wireless device, wherein the first information is obtained by the another wireless device by encrypting a first public key by using the first password, and the first information is used by the another wireless device to obtain a first session key based on the first public key; and
receive the second information fed back by the another wireless device in response to the first information.

15. The wireless device according to claim 14, wherein the first password comprises at least one of an account, a password, a digital signature, biometric feature information, a digital certificate, or voice information.

16. The wireless device according to claim 14, wherein
the second information is obtained by the another wireless device by using the first session key and is used to respond to the first information; and
the at least one processor is further configured to pair with the another wireless device by using the first password and the second information.

17. The wireless device according to claim 16, wherein
the transceiver is further configured to: send the third information to the another wireless device under control of the at least one processor; and receive fourth information fed back by the another wireless device in response to the third information, wherein the fourth information is used by the wireless device to obtain a second random number fed back by the another wireless device for the first random number; and
the at least one processor is further configured to determine, when the first random number is the same as the second random number, that pairing with the another wireless device succeeds.

18. The wireless device according to claim 17, wherein
the at least one processor is further configured to: process the second information by using the first password, to obtain a second public key; obtain a second session key based on the second public key and a first private key; and encrypt the first random number by using the second session key, to obtain the third information.

19. The wireless device according to claim 18, wherein
the at least one processor is further configured to: process the second information by using the first password, to obtain the second public key and a third random number, wherein the third random number corresponds to a fourth random number generated by the another wireless device; and process the first random number and the third random number by using the second session key, to obtain the third information, wherein the third random number is used by the another wireless device to determine to end a pairing procedure with the wireless device or to continue a pairing procedure with the wireless device.

20. A wireless device, comprising:
at least one processor, configured to obtain a first password, wherein the first password is shared by the wireless device and another wireless device, wherein
the at least one processor is further configured to pair with the another wireless device based on a password-based authenticated key exchange (PAKE) protocol and by using the first password as an encryption password in a key exchange process; and
a transceiver, configured to implement, under control of the at least one processor, a transceiver operation in a process of pairing with the another wireless device,
wherein the transceiver is further configured to:
send first information to the another wireless device, wherein the first information is obtained by the wireless device by encrypting a first public key by using the first password, and the first information is used by the another wireless device to obtain a first session key based on the first public key; and
receive second information fed back by the another wireless device in response to the first information, and
wherein the at least one processor is further configured to obtain third information based on the first password and second information received from the another wireless device, wherein the third information is used by the another wireless device to obtain a first random number generated by the wireless device.

* * * * *